United States Patent
Ptaszynski et al.

(10) Patent No.: US 11,933,229 B2
(45) Date of Patent: Mar. 19, 2024

(54) SPEED REDUCTION GEAR FOR AN AIRCRAFT TURBOMACHINE

(71) Applicant: SAFRAN TRANSMISSION SYSTEMS, Colombes (FR)

(72) Inventors: Patrice Julien Ptaszynski, Moissy Cramayal (FR); Antoine Jacques Marie Pennacino, Moissy Cramayal (FR); Boris Pierre Marcel Morelli, Moissy Cramayal (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/165,173

(22) Filed: Feb. 6, 2023

(65) Prior Publication Data

US 2023/0250761 A1 Aug. 10, 2023

(30) Foreign Application Priority Data

Feb. 8, 2022 (FR) ........................... 2201069

(51) Int. Cl.
*F16H 57/08* (2006.01)
*F02C 7/36* (2006.01)

(52) U.S. Cl.
CPC .............. *F02C 7/36* (2013.01); *F16H 57/082* (2013.01); *F05D 2220/323* (2013.01); *F05D 2250/75* (2013.01); *F05D 2260/40311* (2013.01)

(58) Field of Classification Search
CPC .................................. F02C 7/36; F16H 57/082
See application file for complete search history.

(56) References Cited

U.S. PATENT DOCUMENTS

| 5,391,125 | A * | 2/1995 | Turra ................... F16H 1/2836 475/331 |
| 9,103,413 | B2 * | 8/2015 | Curti .......................... F02C 7/36 |
| 11,143,271 | B2 * | 10/2021 | Dombek ............. F16H 57/0479 |
| 11,149,841 | B2 * | 10/2021 | Rappaport .......... F16H 57/0479 |
| 2004/0259679 | A1 | 12/2004 | Becquerelle et al. |
| 2013/0225353 | A1 | 8/2013 | Gallet et al. |
| 2020/0263613 | A1 * | 8/2020 | Simon ................. F16H 57/0006 |

(Continued)

FOREIGN PATENT DOCUMENTS

| CN | 204327938 U | 5/2015 |
| EP | 3699458 A2 | 8/2020 |
| FR | 2853382 A1 | 10/2004 |

(Continued)

OTHER PUBLICATIONS

Preliminary Research Report received for French Application No. 2201069, dated Aug. 31, 2022, 5 pages (1 page of French Translation Cover Sheet and 4 pages of original document).

*Primary Examiner* — Derek D Knight
(74) *Attorney, Agent, or Firm* — WOMBLE BOND DICKINSON (US) LLP

(57) ABSTRACT

Speed reduction gear for an aircraft turbomachine. The reduction gear has a main axis and planet carrier having a cage and a cage carrier, a sun gear located in the cage and centred on the main axis, an annular row of planet gears arranged around the main axis and the sun gear and meshed with the sun gear, and a ring gear arranged around the axis and the cage and meshed with the planet gears. The cage and the cage carrier are connected to each other by connections whose bending flexibility is optimised.

19 Claims, 16 Drawing Sheets

(56) References Cited

U.S. PATENT DOCUMENTS

2021/0262397 A1\* 8/2021 Di Giovanni ........ F16H 57/046

FOREIGN PATENT DOCUMENTS

| FR | 2987416 | A1 | 8/2013 |
|----|---------|----|--------|
| FR | 3041054 | A1 | 3/2017 |
| FR | 3052213 | A1 | 12/2017 |
| FR | 3073915 | A1 | 5/2019 |
| FR | 3084428 | A1 | 1/2020 |

\* cited by examiner

[Fig.1]
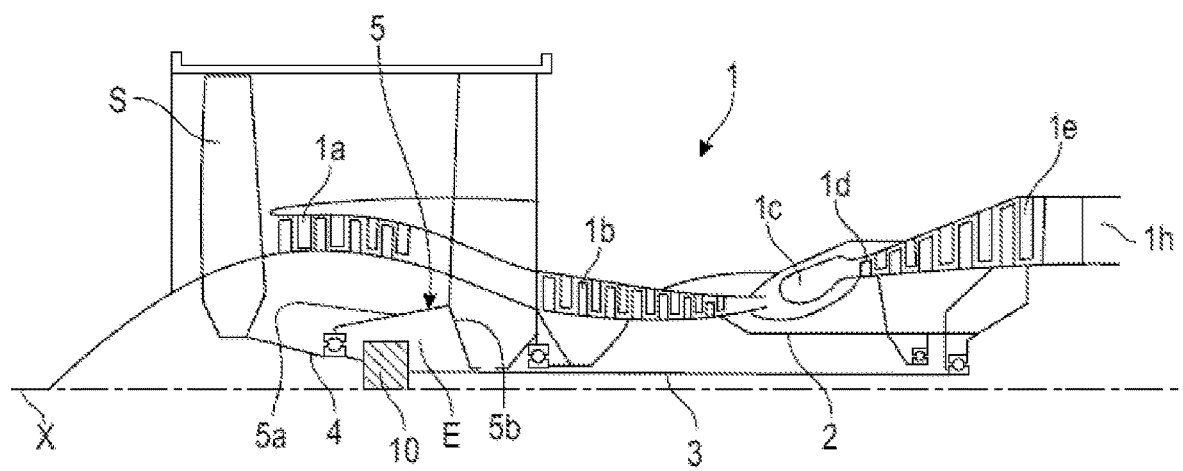

[Fig.2]
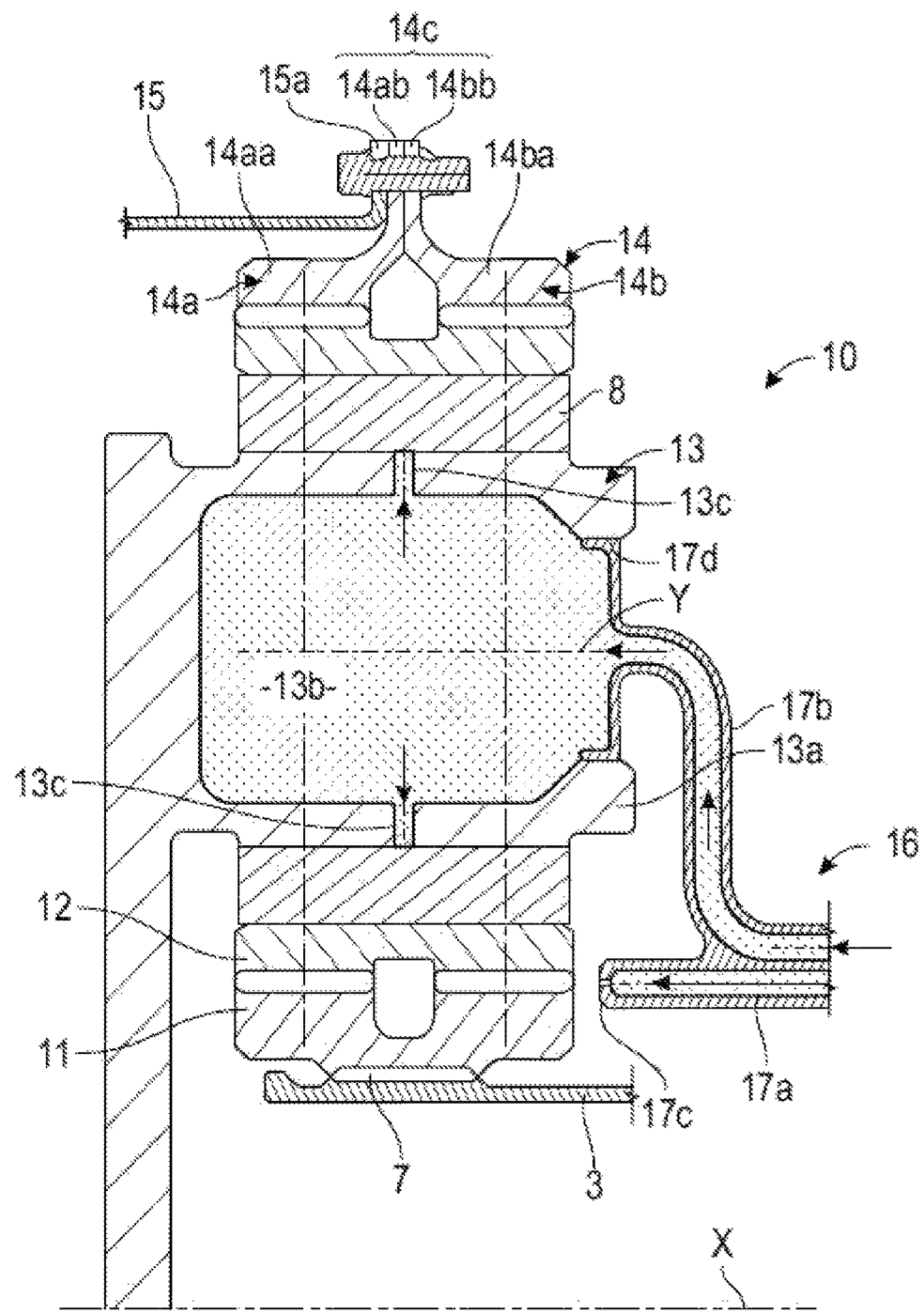

[Fig.3]
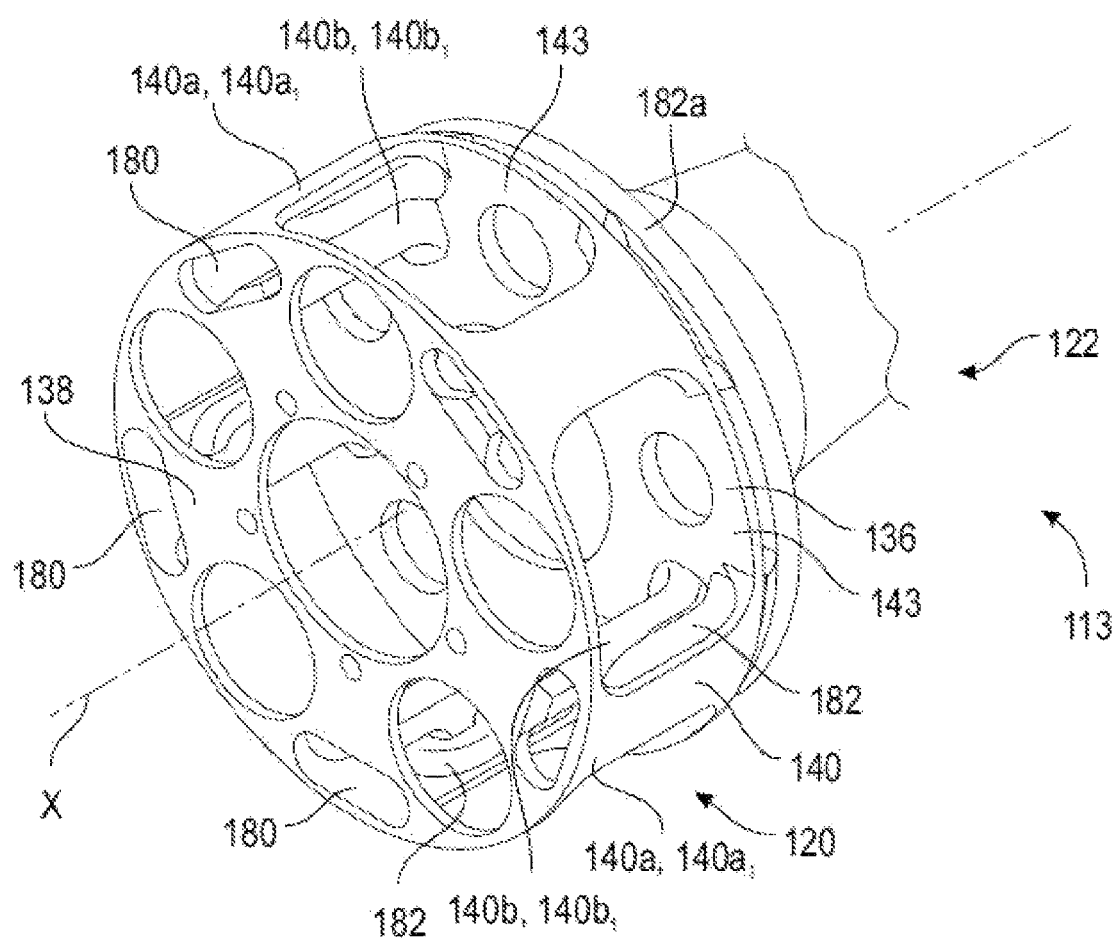

[Fig.4]
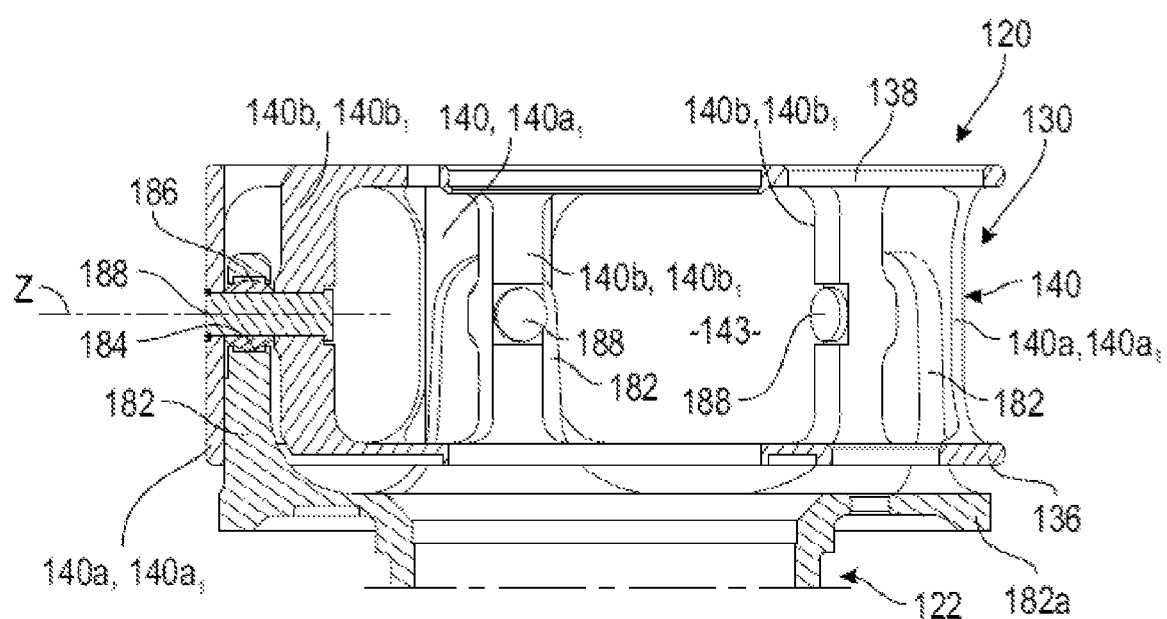

[Fig.5]
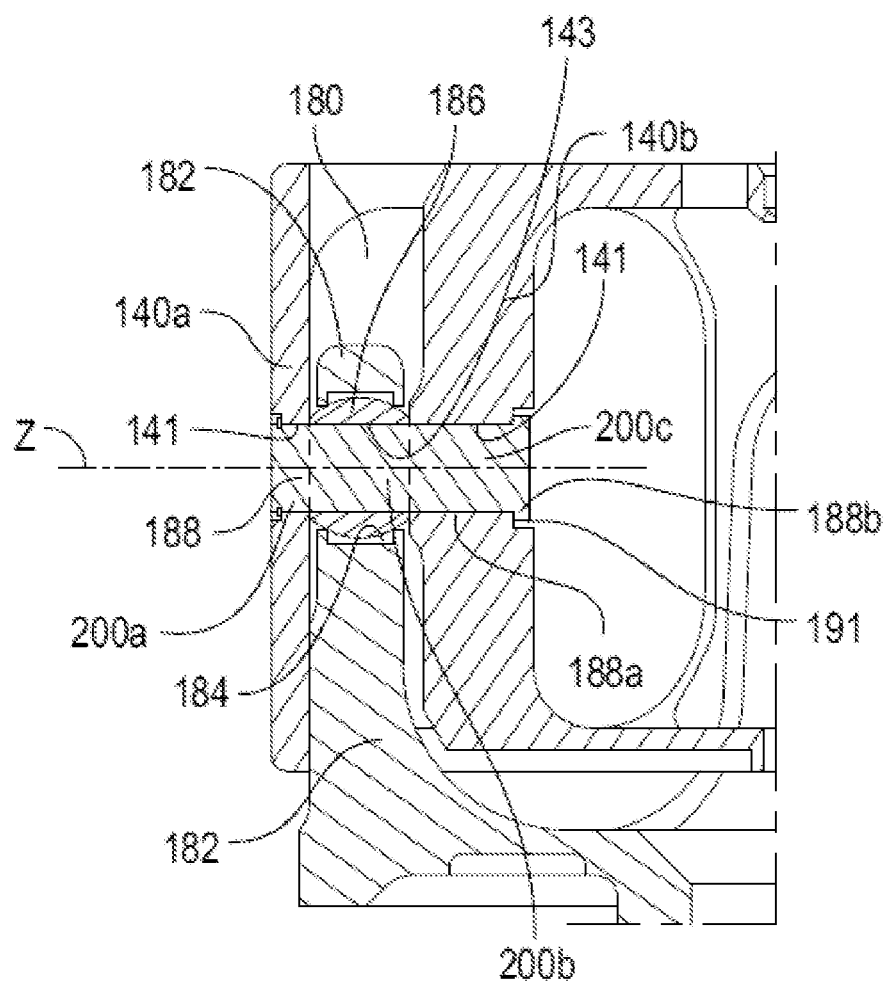

[Fig.6]
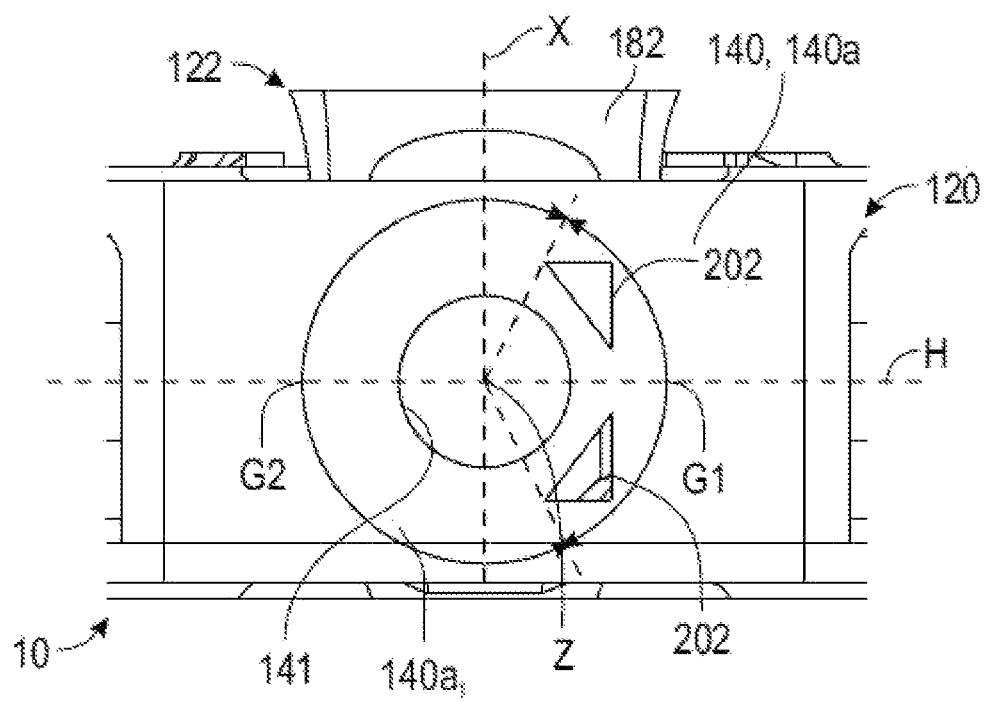

[Fig.7]
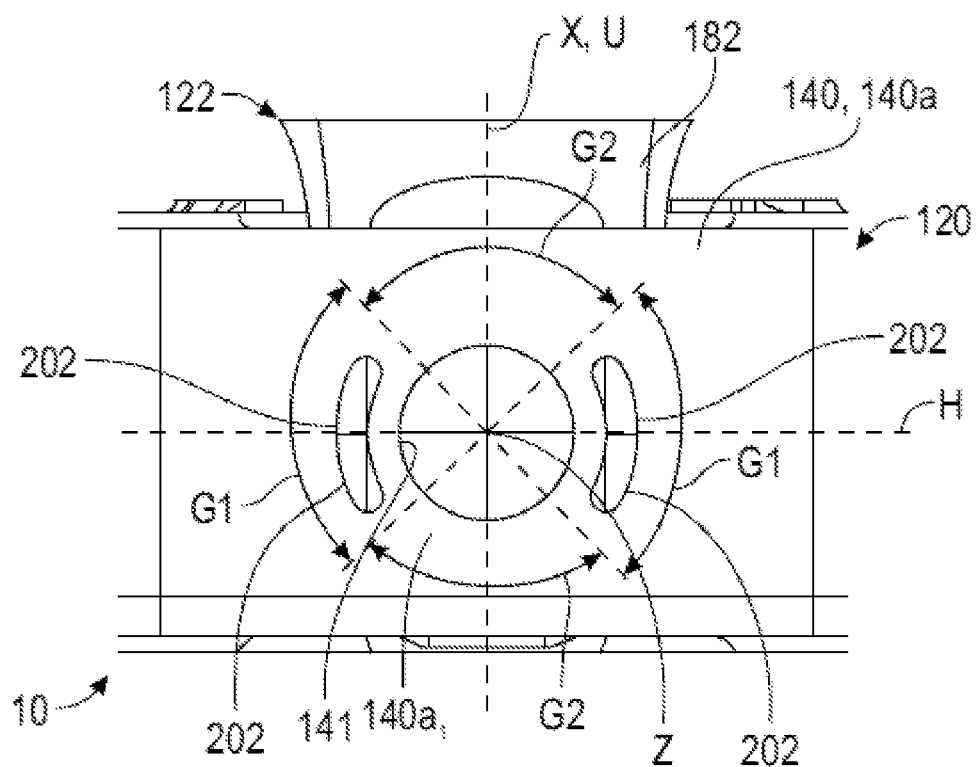

[Fig.8]
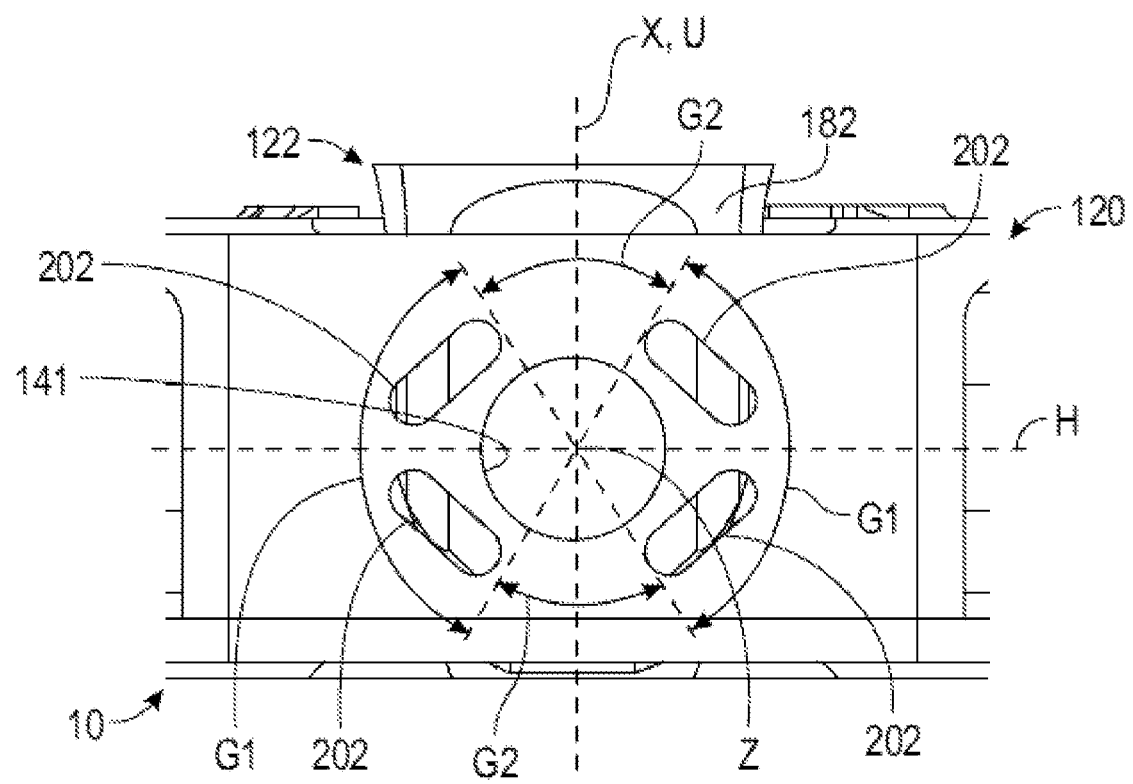

[Fig.9]
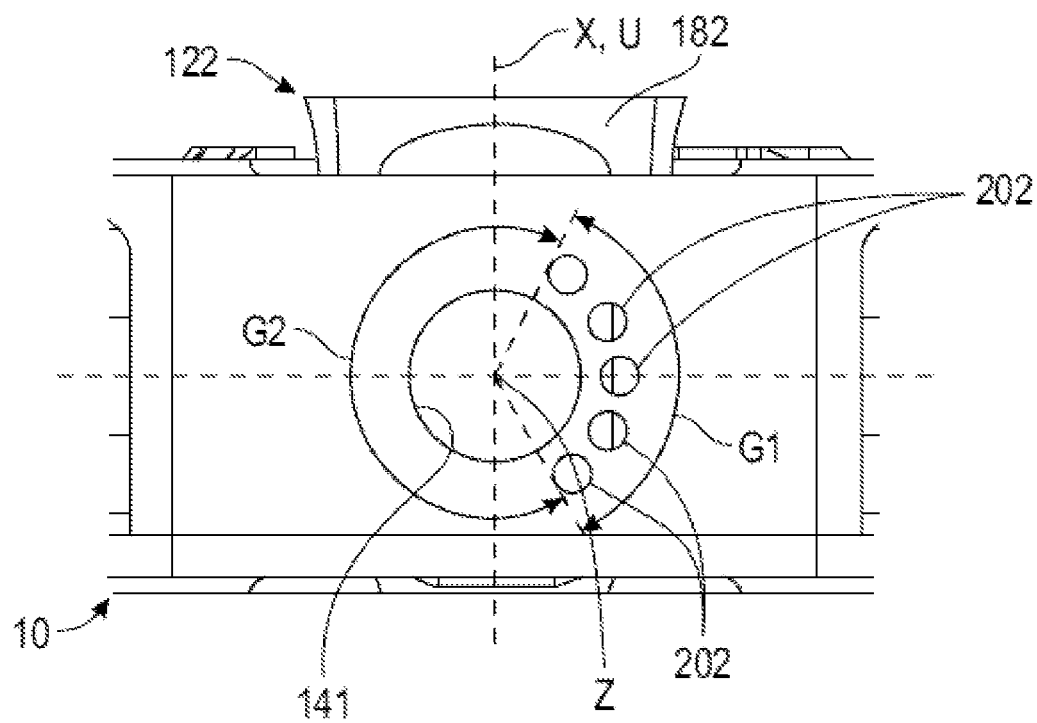

[Fig.10]
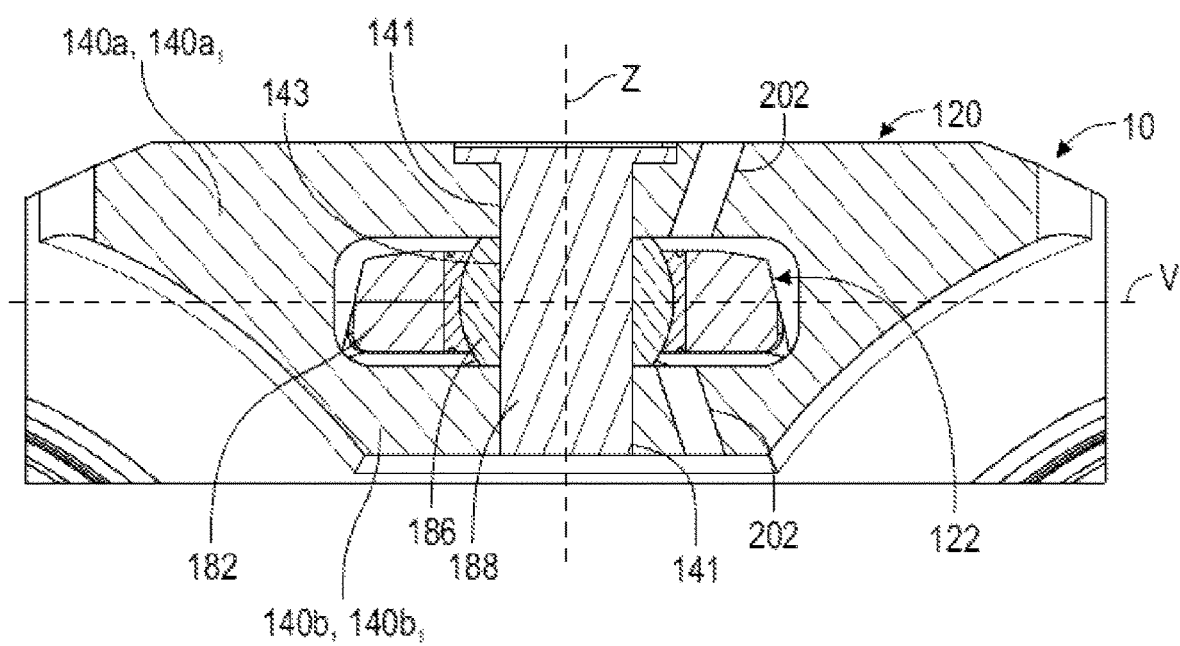

[Fig.11]
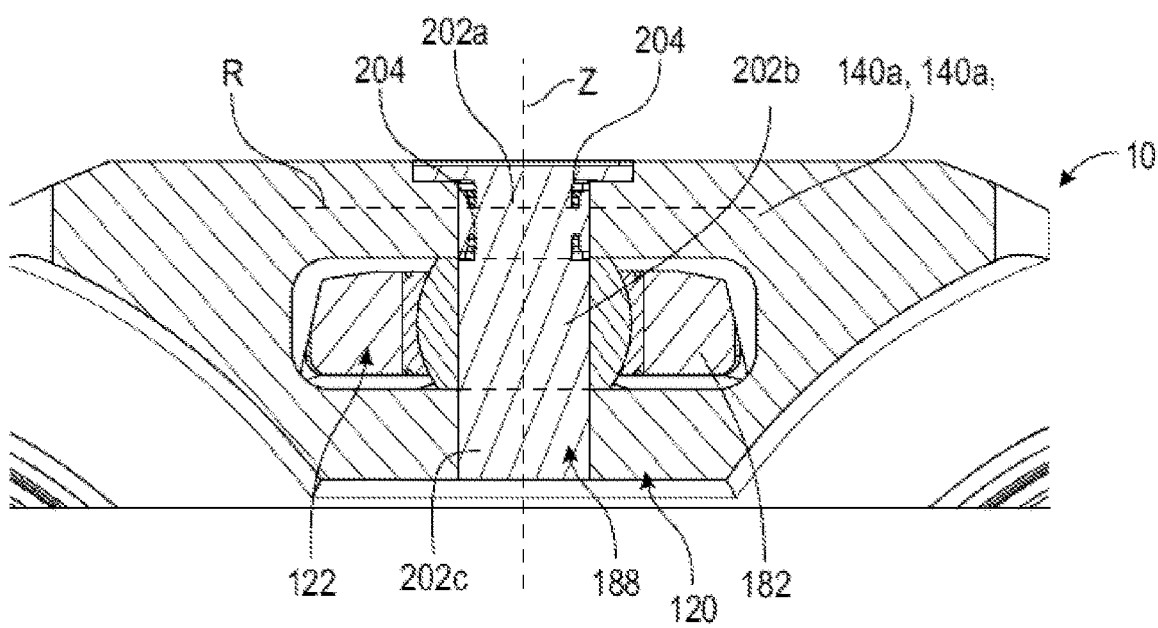

[Fig.12]
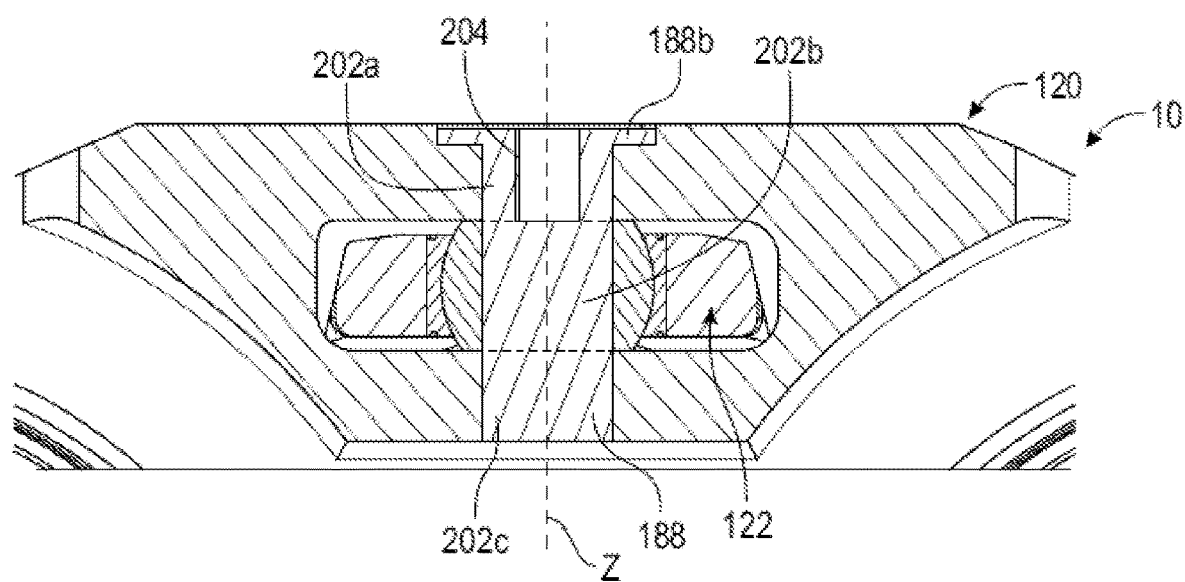

[Fig.13]
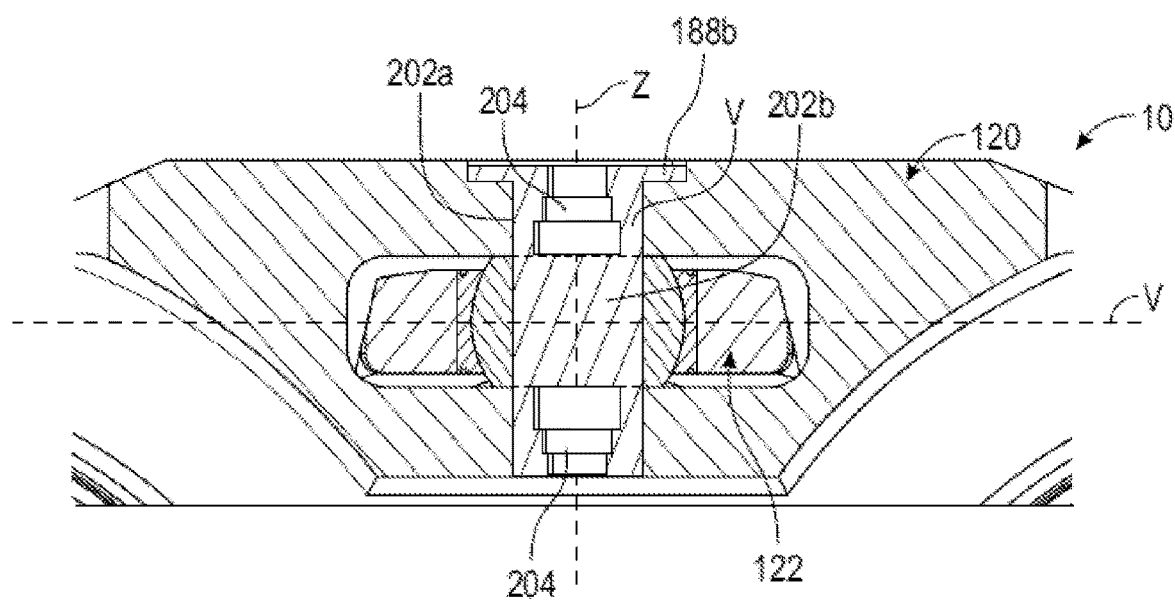

[Fig.14]
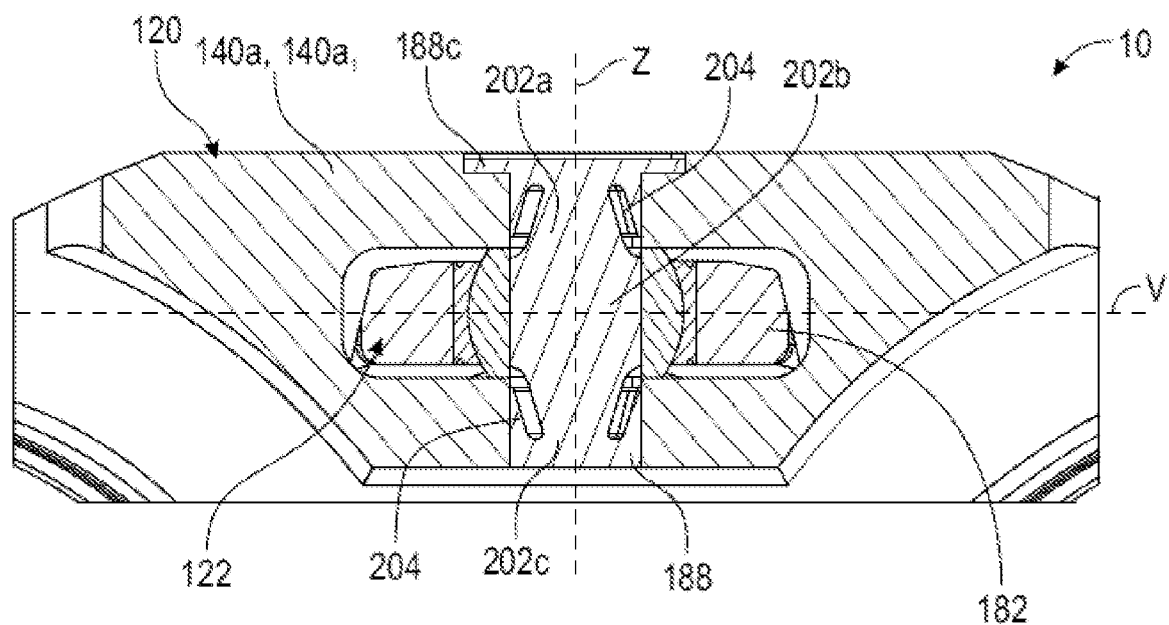

[Fig.15]
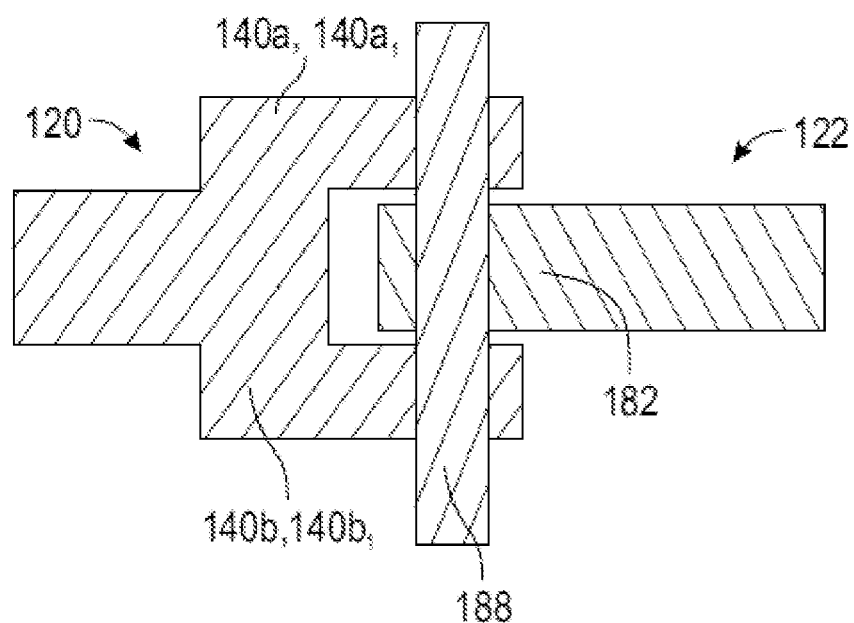

[Fig.16]
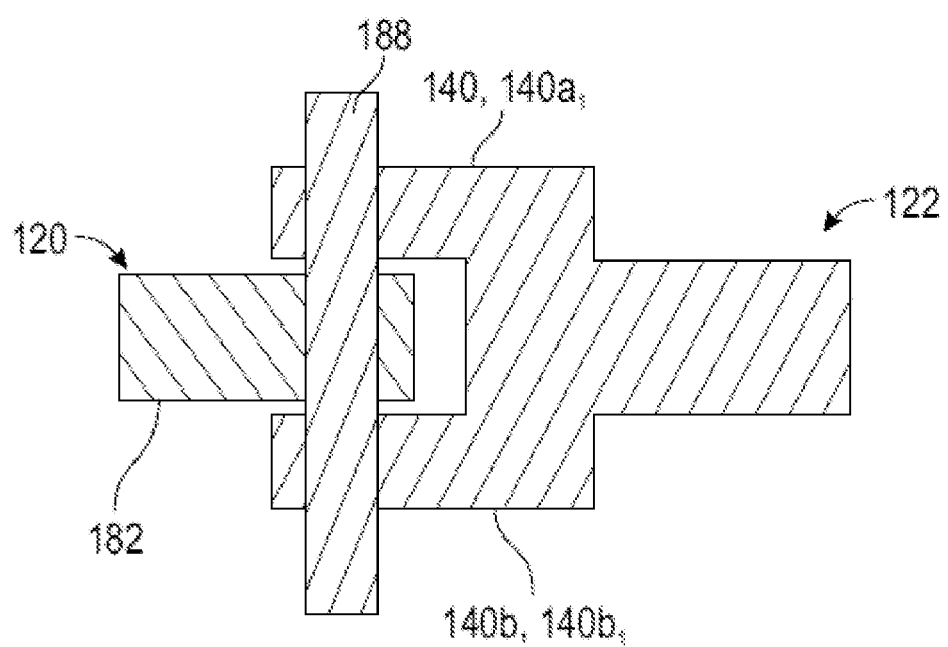

SPEED REDUCTION GEAR FOR AN AIRCRAFT TURBOMACHINE

TECHNICAL FIELD OF THE INVENTION

The present invention relates to a speed reduction gear for an aircraft turbomachine, as well as an aircraft turbomachine comprising such a reduction gear.

TECHNICAL BACKGROUND

The prior art includes, in particular, the documents FR-A1-2 987 416, FR-A1-2 853 382, FR-A1-3 041 054, FR-A1-3 052 213, FR-A1-3 073 915, FR-A1-3 084 428, U.S. Pat. No. 5,391,125, CN-U,204 327 938, and EP-A2-3 699 458.

The role of a mechanical reduction gear is via a transmission mechanism to modify the speed ratio and torque between an input shaft and an output shaft of the drive mechanism.

The new generations of turbofan engines, especially those with high bypass ratios, include a mechanical reduction gear to drive a shaft of a fan. Typically, the purpose of the reduction gear is to transform the so-called fast rotational speed of the shaft of a power turbine into a slower rotational speed for the shaft driving the fan.

Such a reduction gear comprises a central pinion, called the sun gear, a ring gear and pinions called planet gears, which are engaged between the sun gear and the ring gear. The planet gears are held by a frame called a planet carrier. The sun gear, ring gear and planet carrier are planetary gears because their axes of revolution coincide with the longitudinal axis of the turbomachine. The planet gears each have a different axis of revolution and are equally spaced on the same operating diameter around the axis of the planets. These axes are parallel to the longitudinal axis of the turbomachine.

There are several reduction gear architectures. In the prior art of dual flow turbomachines, the reduction gears are of the planetary or epicyclic type. In other similar applications, there are so-called differential or "compound" architectures.

In a planetary reduction gear, the planet carrier is fixed and the ring gear is the output shaft of the device, which turns in the opposite direction to the sun gear.

On an epicyclic reduction gear, the ring gear is fixed and the planet carrier is the output shaft of the device which rotates in the same direction as the sun gear.

On a compound reduction gear, no element is fixed in rotation. The ring gear rotates in the opposite direction to the sun gear and the planet carrier.

The reduction gears can be composed of one or more meshing stages. This engagement is achieved in different ways such as by contact, friction or magnetic field. There are several types of contact gearing, such as spur or herringbone toothing.

The planet carriers can be a single piece or a cage and cage carrier. The cage comprises an inner cavity in which the sun gear, the planet gears and the guide bearings of the planet gears are housed. The sun gear includes inner splines for coupling to a first shaft of the turbomachine and the cage carrier includes a cylindrical portion with outer splines for coupling to another shaft.

The connection of the cage to the cage carrier is generally rigid. Alternatively, a technology can be envisaged in which the cage is connected to the cage carrier by "flexible" connections, as described in the document FR-A1-2 853 382. In such a case, the cage carrier comprises an annular row of axial fingers which carry first connecting elements. These first connecting elements cooperate with second connecting elements mounted in housings of the cage to form the flexible connections between the cage carrier and the cage, which allow at least two degrees of freedom.

It has already been proposed that these flexible connections be made with ball joints, the fingers carrying ball joints through which cylindrical spindles extend into the housings of the cage.

In operation, when the planet carrier is torqued, the fingers will bend and transmit torque to the cage. The ball joints ensure that the deflection of the fingers is not transmitted to the spindles. The cage carrier keeps the cage in its plane of symmetry in order to balance the recovery of forces on both sides of the planet gears.

In this configuration, it is important to minimise the risk of misalignment due to torsion being transmitted to the planet gears. This can be achieved by the connection between the cage and the cage carrier in a median plane of the cage and by the degrees of freedom provided by the flexible connections mentioned above. This allows two identical force paths on the front and rear parts of each planet gear, and therefore limits their risk of misalignment.

However, it can be seen that, in the plane of the link, the force paths are not completely identical due to the bending of the spindles between the cage and the cage carrier. This results in different contact pressures and sliding amplitudes between the interfaces, and thus in possible premature wear of the most stressed interface. This also increases the deformation of the cage and overstressing can occur. In addition, the contact areas are not evenly distributed due to the bending of the spindles, which creates an additional risk of fretting.

The present invention provides an improvement which provides a simple, effective and economical solution to at least some of the above problems.

SUMMARY OF THE INVENTION

The invention relates to a speed reduction gear for an aircraft turbomachine, the reduction gear having a main axis and comprising:

a planet carrier comprising a cage and a cage carrier,
a sun gear located in the cage and centred on the main axis,
planet gears arranged around the main axis and the sun gear and meshed with the sun gear,
a ring gear arranged around the axis X and the cage and meshed with the planet gears,
one element selected from the cage and the cage carrier comprising an annular row of axial fingers around the main axis, and the other of these elements comprising an annular row of axial housings in which the fingers are mounted, each of the housings being delimited by two bridges, respectively radially inner and outer, which comprise radial orifices aligned with a radial orifice of the finger interposed between these bridges, the orifices of the bridges and of the finger being traversed by a spindle oriented along a radial axis, each of the spindles comprising a radially outer segment extending into the orifice of the outer bridge, an intermediate segment extending into the orifice of the finger, and a radially inner segment extending into the orifice of the inner bridge, characterised in that:
at least one of the bridges of each of the housings comprises at least one first circumferential zone extending around the radial axis, which comprises at least one recess, and at least one second circumferential zone around the radial axis, which is devoid of recess, so as to make at least one of the bridges more flexible, and/or at least one of the outer and inner segments of each of the spindles comprises at least one recess which is centred on the radial axis or extends around this radial axis, and the intermediate segment of each of the spindles is devoid of such a recess, so as to make the spindle more flexible.

Flexible zones are thus created in at least one of the bridges and/or in the spindles, so as to better balance the contacts and the stresses during the transmission of forces. The invention thus allows for a better distribution of pressure and sliding on each zone and thus reduces the risk of "fretting".

The present invention is compatible with:
a single-stage or multi-stage reduction gear;
a planetary, epicyclic or differential reduction gear;
straight, helical or herringbone toothings;
any type of planet gear bearings, whether it is composed of rolling elements, hydrodynamic bearings, etc.

The reduction gear according to the invention may comprise one or more of the following features, taken in isolation from each other, or in combination with each other:

each of the inner and/or outer bridges comprises the first single circumferential zone that extends 60 to 180° around the radial axis, and the second single circumferential zone that extends 180 to 300° around the radial axis, each of the inner and/or outer bridges comprises two first circumferential zones which are diametrically opposed with respect to the radial axis, and two second circumferential zones which are located between the first circumferential zones, each of the recesses extends through the entire thickness of the bridge, each of the recesses has a circular, oblong, curved or elliptical cross-section in a plane perpendicular to the radial axis, each of the recesses extends in the radial direction at an angle to the radial axis, the first circumferential zones are located in or cut by a plane perpendicular to the main axis, and the second circumferential zones are located in or cut by planes passing through the main axis, at least one of the inner and outer segments of each of the spindles comprises an annular groove formed in said segment and extending around the radial axis, the groove is generally L-shaped in section, at least one of the inner and outer segments of each of the spindles comprises two annular grooves in an L shape and arranged symmetrically with respect to a plane perpendicular to the radial axis, at least one of the inner and outer segments of each of the spindles comprises an inner, preferably axial, bore which extends over the entire axial length of this segment, the bore is stepped and comprises several axial portions of different diameters, the inner and outer segments of each of the spindles comprise recesses which are arranged symmetrically with respect to a plane perpendicular to the radial axis and passing substantially through the middle of the spindle, said first circumferential area extends for at least 90° around the radial axis, said at least one recess extends or is distributed over at least 90° around the radial axis, the inner and outer bridges have the same or similar thicknesses and each of these bridges comprises at least one recess, the inner and outer bridges have different thicknesses and only the one with the greater thickness is the only one comprising at least one recess, the orifice of each finger receives a ball joint through which said spindle passes, the planet gears are distributed around the main axis of the reduction gear, the fact of making the bridge(s) and/or the spindle more flexible is carried out in bending and/or compression.

The invention also relates to a turbomachine, in particular an aircraft, comprising a reduction gear as described above.

BRIEF DESCRIPTION OF THE FIGURES

Further features and advantages will be apparent from the following description of a non-limiting embodiment of the invention with reference to the attached drawings in which:

FIG. 1 is a schematic axial sectional view of a turbomachine using the invention;

FIG. 2 is a schematic axial sectional view of an epicyclic reduction gear;

FIG. 3 is a schematic perspective view of a cage of a reduction gear planet carrier;

FIG. 4 is a schematic axial sectional view of a cage and planet carrier cage carrier;

FIG. 5 is a detail view of FIG. 4;

FIG. 6 is a schematic partial top view of a reduction gear according to the invention, and illustrates a first embodiment of the bridges of its planet carrier;

FIG. 7 is a partial schematic view from above of a reduction gear according to the invention, and illustrates a second embodiment of the bridges of its planet carrier;

FIG. 8 is a partial schematic view from above of a reduction gear according to the invention, and illustrates a third embodiment of the bridges of its planet carrier;

FIG. 9 is a partial schematic view from above of a reduction gear according to the invention, and illustrates a fourth embodiment of the bridges of its planet carrier;

FIG. 10 is a partial schematic cross-sectional view of a reduction gear according to the invention, and illustrates a fifth embodiment of the bridges of its planet carrier;

FIG. 11 is a partial schematic cross-sectional view of a reduction gear according to the invention, and illustrates a first embodiment of a spindle of its planet carrier;

FIG. 12 is a partial schematic cross-sectional view of a reduction gear according to the invention, and illustrates a second embodiment of a spindle of its planet carrier;

FIG. 13 is a partial schematic cross-sectional view of a reduction gear according to the invention, and illustrates a third embodiment of a spindle of its planet carrier;

FIG. 14 is a partial schematic cross-sectional view of a reduction gear according to the invention, and illustrates a fourth embodiment of a spindle of its planet carrier;

FIG. 15 is a very schematic partial view of a type of connection between a cage and a cage carrier of a reduction gear planet carrier; and FIG. 16 is a very schematic partial view of another type of connection between a cage and a cage carrier of a reduction gear planet carrier.

DETAILED DESCRIPTION OF THE INVENTION

FIG. 1 describes a turbomachine 1 which conventionally comprises a fan S, a low-pressure compressor 1a, a high-pressure compressor 1b, an annular combustion chamber 1c, a high-pressure turbine 1d, a low pressure turbine 1e and an exhaust nozzle 1h. The high-pressure compressor 1b and the high-pressure turbine 1d are connected by a high-pressure shaft 2 and together form a high-pressure (HP) body. The low-pressure compressor 1a and the low-pressure turbine 1e are connected by a low-pressure shaft 3 and together form a low-pressure (LP) casing.

The fan S is driven by a fan shaft 4 which is connected to the LP shaft 3 by means of a reduction gear 10. This reduction gear is usually of the planetary or epicyclic type.

Although the following description refers to a planetary or epicyclic reduction gear, it also applies to a mechanical differential in which its three essential components, namely the planet carrier, the ring gear and the sun gear, are rotatable, the rotational speed of one of these components being dependent, in particular, on the speed difference of the other two components.

The reduction gear 10 is positioned in the upstream part of the turbomachine. A fixed structure comprising schematically, here, an upstream part 5a and a downstream part 5b which makes up the engine casing or stator 5 is arranged so as to form an enclosure E surrounding the reduction gear 10. This enclosure E is closed upstream by seals at the level of a bearing allowing the passage of the fan shaft 4, and downstream by seals at the level of the passage of the LP shaft 3.

FIG. 1 shows part of a reduction gear 10 which can take the form of different architectures depending on whether certain parts are fixed or rotating. The input of the reduction gear 10 is connected to the LP shaft 3, e.g. via splines 7. Thus, the LP shaft 3 drives a planetary gear called the sun gear 11. Classically, the sun gear 11, whose axis of rotation is coincident with the axis X of the turbomachine 1, drives a series of pinions called planet gears 12, which are equally spaced on the same diameter around the axis of rotation X. This diameter is equal to twice the operating centre distance between the sun gear 11 and planet gears 12. The number of planet gears 12 is generally defined between three and seven for this type of application.

The set of planet gears 12 are held together by a frame called a planet carrier 12. Each planet gear 12 rotates around its own axis Y and meshes with the ring gear 14.

At the output of the reduction gear 10, we have:
In an epicyclic configuration, the set of the planet gears 12 rotate the planet carrier 13 around the axis X of the turbomachine. The ring gear 14 is attached to the engine casing or stator 5 via a ring gear carrier 15 and the planet carrier 12 is attached to the fan shaft 4.
In a planetary configuration, the set of planet gears 12 is held by a planet carrier 12 which is attached to the engine casing or stator 5. Each planet gear drives the ring gear which is attached to the fan shaft 4 via a ring gear carrier 15.

Each planet gear 12 is freely rotatably mounted by means of a bearing 8, for example a bearing or hydrostatic bearing. Each bearing 8 is mounted on one of the shafts 13a of the planet carrier 12 and all the shafts are positioned in relation to each other by means of one or more structural frames of the planet carrier 12. There are a number of shafts and bearings equal to the number of planet gears. For reasons of operation, mounting, manufacture, inspection, repair or replacement, the axles 13a and the frame may be separated into several parts.

For the same reasons mentioned above, the toothing of a reduction gear can be separated into several helices. In our example we will detail the operation of a multi-helix reduction gear 10 with one ring gear separated into two half ring gears:

A front half ring gear 14a consisting of a rim 14aa and a mounting half flange 14ab. On the rim 14aa is the front helix of the toothing of the reduction gear. This front helix meshes with that of the planet gear 12 which meshes with that of the sun gear 11.

A rear half ring gear 14b consisting of a rim 14ba and a mounting half flange 14bb. On the rim 14ba is the rear helix of the toothing of the reduction gear. This rear helix meshes with that of the planet gear 12 which meshes with that of the sun gear 11.

The mounting half flange 14ab of the front ring gear 14a and the mounting half flange 14bb of the rear ring gear 14b form the ring gear fixing flange 14c. The ring gear 14 is attached to the ring gear carrier 15 by joining the ring gear fixing flange 14c and the mounting flange 15a of the ring gear carrier by means of a bolted connection, for example. In the following, a half flange may be called a flange.

The arrows in FIG. 1 describe the oil flow in the reduction gear 10. The oil enters the reduction gear 10 from the stator part 5 into the turbine stator vane 16 by different means, which will not be specified in this view because they are specific to one or more types of architecture. The turbine stator vane 16 is separated into two parts, each of which is generally repeated by the same number of planet gears. The function of the injectors 17a is to lubricate the toothings, and the function of the arms 17b is to lubricate the bearings 8. The oil is fed to the injector 17a and out the end 17c to lubricate the toothings. The oil is also fed to each arm 17b and circulates through the supply port 17d of the bearing 8. The oil then flows through the axle 13a into a buffer zone or zones 13b and out through orifices 13c to lubricate the bearings 8 of the planet gears.

In FIGS. 3 to 5, the elements already described in the foregoing are designated by the same references increased by one hundred.

FIGS. 3 to 5 depict a particular technology of planet carrier 113, this planet carrier comprising a cage 120 and a cage carrier 122 connected by ball and socket joints.

The cage 120 comprises two radial annular walls 136, 138 which are parallel to each other and perpendicular to the axis X, and a cylindrical wall 140 which extends between the outer peripheries of these walls 136, 138.

The cylindrical wall 140 is here of the double-skinned type and comprises an outer skin 140a interrupted by openings 143 and an inner skin 140b interrupted by the same openings 143. In the example shown, which is not limiting, the outer skin 140a separated by five openings 143 forms five exterior or outer bridges 140a1, and the inner skin 140b separated by five openings 143 forms five interior or inner bridges 140b1. Each pair of inner and outer bridges 140a1, 140b1 form a clevis to accommodate one of the fingers 182 of the cage carrier 122. In other words, the bridges 140a1, 140b1 of each pair define between them a housing 180 for receiving a finger 182 of the cage carrier 122. The bridges provide the structural connection between the walls 136 and 138. Oblong openings are made in at least one of the walls 136 and 138 and open into the housings 180 so as to allow the finger 182 to pass between the inner and outer bridges 140a1, 140b1.

The cage 120 thus comprises an annular row of housings 180. These housings 180 receive the axial fingers 182 integral with a substantially radial annular wall 182a of the cage carrier 122. The wall 182a is located at an axial end of the cage carrier 122. The fingers 182 extend axially from the wall 182a and are engaged by axial translation in the housings 180.

Each finger 182 comprises, substantially in its middle, a ring 184 for mounting the ball joint 186 intended to be traversed by a cylindrical spindle 188 carried by the cage 120.

The ring 184 has a substantially radial orientation with respect to the axis X. It has a generally cylindrical shape. The cage 120 and the ball joint 186 have a thickness, measured in a radial direction with respect to the axis X, which is less than the inter-bridge distance or the radial thickness of the oblong opening 180, so as to be able to be engaged in this housing concomitantly with the finger 182 supporting these parts.

Each housing 180 is traversed by a spindle 188 which has a substantially radial orientation with respect to the axis X. Each spindle 188 comprises a cylindrical body 188a connected at an axial end, here radially inner, to an outer annular collar 188b. The spindle 188 is here engaged by radial translation from the inside through radial orifices 141, 143 of the bridges 140a1, 140b1 and of the ball joint 186, its collar 188b being intended to come into radial abutment on a plane face 191 of the exterior bridge 140a1 of the cage 120 in the example shown. After insertion of the spindle 188 into the orifices of the bridges, until the collar 188b bears on the exterior bridge 140a1, the collar 188b is fixed to this bridge, for example by screwing.

With reference to FIGS. 5, 200a, 200b and 200c are defined as three adjacent segments of each of the spindles 188 which are schematically separated in the drawing by dotted lines. Each spindle 188 comprises:
- a radially outer segment 200a which extends into the orifice 141 of the outer bridge 140a1,
- an intermediate segment 200b which extends into the orifice 143 of the finger 182 and its ball joint 186, and
- a radially inner segment 200c which extends into the orifice 141 of the inner bridge 140b1.

It can be seen that the segments 200a, 200b, 200c do not have the same length along the radial axis Z defined by the spindle 188. This is due to the fact that the reception orifices 141, 143 of these segments 200a, 200b, 200c do not have the same lengths and more precisely to the fact that the thicknesses of the bridges 140a1, 14b1 and of the spindle 188 (or of its ball joint 186) measured along this axis X are not the same. For example, the inner bridge 140b1 has a greater thickness than the outer bridge 140a1.

As mentioned above, during the transmission of forces from the cage carrier 122 to the cage 120 and the planet gears 12, via the spindles 188 and the bridges 140a1, 140b1, and of forces from the planet gears 12 to the cage 120 and the cage carrier 122, via the spindles 188 and the bridges 140a1, 140b1, bending phenomena occur at the level of the bridges 140a1, 140b1 and the spindles 188, which can generate premature wear of the reduction gear 10 and thus reduce its service life.

The present invention provides a solution to this problem and more particularly two solutions which can be combined together or used independently of each other. The common point between these solutions is that they allow to locally make more flexible the connections between the cage 120 and the cage carrier 122 and to homogenise the deformations between the inner skin 140a and the outer skin 140b in order to better distribute the force for the inner skin 140a, and to limit the detachments for the outer skin 140b.

According to a first solution, at least one of the bridges 140a1, 140b1 comprises at least one first circumferential zone G1 extending around the axis Z, which comprises at least one recess 202, and at least one second circumferential zone G2 around the axis Z, which is devoid of recesses.

According to the second solution, at least one of the outer segment 200a and inner segment 200c of each of the spindles 188 comprises at least one recess 204 which is centred on the axis Z or extends around this axis Z, while the intermediate segment 200b is devoid of such a recess.

FIGS. 6 to 10 illustrate embodiments of the first solution and FIGS. 11 to 14 illustrate embodiments of the second solution.

In the embodiment shown in FIG. 6, the outer bridge 140a1, or even the inner bridge 140b1, comprises a single first circumferential zone G1 which extends over approximately 120° about the axis Z and which is located on one side of the spindle 188 and the finger 182. The first zone G1 is cut in the middle by a plane H perpendicular to the axis X and passing through the axis Z. The zone G1 comprises two recesses 202 of generally triangular shape which extend over the entire thickness of the corresponding bridge. The recesses 202 are symmetrical with respect to this plane H. The second zone G2 extends around the axis Z, on the complementary part, and thus has an angular extent of the order of 240°.

In the embodiment shown in FIG. 7, the outer bridge 140a1, or even the inner bridge 140b1, comprises two first circumferential zones G1, each of which extends for about 60° around the axis Z and which are diametrically opposed with respect to this axis Z. The zones G1 are cut in the middle by the plane H perpendicular to the axis X and passing through the axis Z. Each zone G1 comprises a single recess 202 of generally curved shape in the form of an arc of a circle about the axis Z, and which extends over the entire thickness of the corresponding bridge. The recesses 202 are symmetrical with respect to a plane U passing through the axes X and Z. The bridge 140a1 further comprises two second zones G2 interposed between the zones G1 and thus diametrically opposed with respect to the axis Z.

In the embodiment shown in FIG. 8, the outer bridge 140a1, or even the inner bridge 140b1, comprises two first circumferential zones G1 which each extend for approximately 120° around the axis Z and which are diametrically opposed with respect to this axis Z. The zones G1 are cut in the middle by the plane H perpendicular to the axis X and passing through the axis Z. Each zone G1 comprises two recesses 202 of generally elongated shape, and which extend over the entire thickness of the corresponding bridge. The recesses 202 are symmetrical with respect to the plane H as well as the plane U. The bridge 140a1 further comprises two second areas G2 interposed between the areas G1 and thus diametrically opposed with respect to the axis Z.

In the embodiment shown in FIG. 9, the outer bridge 140a1, or even the inner bridge 140b1, comprises a single first circumferential zone G1 which extends over approximately 120° about the axis Z and which is located on one side of the spindle 188. The first zone G1 is cut in the middle by a plane H perpendicular to the axis X and passing through the axis Z. The zone G1 comprises five recesses 202 of generally circular shape which extend over the entire thickness of the corresponding bridge. The recesses 202 are symmetrical with respect to this plane H. The second zone G2 extends around the axis Z on the complementary part and thus has an angular extent of the order of 240°.

The recesses 202 formed in the bridges 140a1, 140b1 may be radially oriented, i.e., parallel to the axis Z, or inclined with respect to that axis Z as illustrated in FIG. 10. In the example shown, said or each recess 202 of the outer bridge 140a1 is inclined towards the outside with respect to the axis Z, as one moves away from the finger 182 along the axis Z. Said or each recess 202 of the inner bridge 140b1 is inclined towards the outside with respect to the axis Z as it moves away from the finger 182 along that axis Z. The recesses 202 in the bridges 140a, 140b1 are thus symmetrical with respect to a plane V perpendicular to the axis Z and passing substantially through the middle of the housing 180 or the finger 182.

FIG. 10 also shows that the bridges 140a1, 140b1 have identical or similar thicknesses. Each bridge 140a1, 140b1 includes at least one recess 202 and is therefore made more flexible in the area G1.

In the event that one of the bridges is thicker in a radial direction, only that bridge may comprise one or more recesses 202 to make it more flexible in a zone G1 and compensate for its rigidity related to its greater thickness.

In the embodiment shown in FIG. 11, the outer segment 200a of the spindle 188 comprises recesses 204 and the other segments 200b, 200c of the spindle 188 do not.

The recesses 204 are here annular grooves which are formed on the outer cylindrical surface of the segment 200a and extend around the axis Z. The grooves are axially spaced from each other and are symmetrical with respect to a plane R perpendicular to the axis Z and passing substantially through the middle of the segment 200a or the outer bridge 140a1. Each of the grooves is generally L-shaped in cross-section and comprises a branch oriented radially with respect to the axis Z and opening onto the surface of the segment 200a, and an axially oriented branch extending from the inner periphery of the radial branch.

In the embodiment shown in FIG. 12, the outer segment 200a of the spindle 188 comprises a single recess 204 and the other segments 200b, 200c of the spindle 188 do not.

The recess 204 is here an inner bore which is centred on the axis Z and which opens at the radially outer end of the spindle, which here carries the collar 188b. The bore has a generally cylindrical shape.

In the embodiment shown in FIG. 13, the outer segment 200a and the inner segment of the spindle 188 comprise a single recess 204 and the intermediate segment 200b does not.

The recess 204 of the outer segment 200a is an inner bore that is centred on the axis Z and opens at the radially outer end of the spindle, which here carries the collar 188b. The recess 204 of the inner segment 200b is an inner bore which is centred on the axis Z and opens at the radially inner end of the spindle. Each bore has a generally stepped shape and comprises adjacent cylindrical portions, here three in number. The bores are symmetrical with respect to the aforementioned plane V.

In the embodiment shown in FIG. 14, the outer segment 200a and the inner segment 200c of the spindle 188 each comprise a single recess 204 and the intermediate segment 200b does not.

The recess 204 of the outer segment 200a is an annular groove which extends around the axis Z and which opens at the radially inner end of this segment. The recess 204 of the inner segment 200b is an annular groove that extends around the axis Z and opens at the radially outer end of that segment. Each groove has a generally frustoconical shape.

The groove in the outer segment 200a flares inwards and the groove in the inner segment 200b flares towards the outside. The grooves are symmetrical with respect to the plane V.

FIGS. 15 and 16 show that the flexible connection between the cage 120 and the cage carrier 122 of the planet carrier 13 of a reduction gear 10 can be reversed. In the case of FIG. 15 which corresponds to the examples described above, the cage 120 comprises the bridges 140a1, 140b1 which define the housings 180 for receiving the fingers 182 of the cage carrier 122. In the case of FIG. 16, it is the cage carrier 122 which comprises the bridges 140a1, 140b1 which define the housings 180 for receiving the fingers 182 of the cage 120. The invention applies to both these configurations.

The zones G1 where the connections between the cage 120 and the cage carrier 122 of the reduction gear 10 are flexible allow to homogenise the force paths through these connections. They also allow for a better distribution of the pressure and sliding on each zone and thus reduce the risk of wear by "fretting".

The invention claimed is:

1. A speed reduction gear for an aircraft turbomachine, this reduction gear having a main axis and comprising:
 a planet carrier comprising a cage and a cage carrier,
 a sun gear located in the cage and centred on the main axis,
 planet gears arranged around the main axis and the sun gear and meshed with the sun gear,
 a ring gear arranged around the axis and the cage and meshed with the planet gears,
 one element selected from the cage and the cage carrier comprising an annular row of axial fingers disposed about the main axis, and the other of these elements comprising an annular row of axial housings in which the fingers are mounted, each of the housings being delimited by two bridges, respectively radially inner and outer, which comprise radial orifices aligned with a radial orifice of the finger inserted between these bridges, the orifices of the bridges and of the finger being traversed by a spindle oriented along a radial axis, each of the spindles comprising a radially outer segment extending into the orifice of the outer bridge an intermediate segment extending into the orifice of the finger, and a radially inner segment extending into the orifice of the inner bridge
 wherein:
  at least one of the bridges of each of the housings comprises at least one first circumferential zone extending around the radial axis, which comprises at least one recess, and at least one second circumferential zone around the radial axis, which is devoid of recesses, so as to make the at least one of the bridges more flexible, wherein each of said at least one recess extends through the entire thickness of the bridge, and/or
  at least one of the outer and inner segments of each of the spindles comprises at least one recess which is centred on the radial axis or extends around that radial axis, and the intermediate segment of each of the spindles is free of such a recess, so as to make the spindle more flexible.

2. The reduction gear according to claim 1, wherein each of the inner and/or outer bridges comprises the single first circumferential zone which extends 60 to 180° around the radial axis, and the single second circumferential zone which extends 180 to 300° around the radial axis.

3. The reduction gear according to claim 1, wherein each of the inner and/or outer bridges comprises two first circumferential zones which are diametrically opposed with respect to the radial axis, and two second circumferential zones which are located between the first circumferential zones.

4. The reduction gear according to claim 1, wherein each of said at least one recess of the bridges has a circular, oblong, curved or elliptical cross-section in a plane perpendicular to the radial axis.

5. The reduction gear according to claim 1, wherein each of said at least one recess of the bridges extends in a radial direction at an angle to the radial axis.

6. The reduction gear according to claim 1, wherein the first circumferential zones are cut by a plane perpendicular to the main axis, and the second circumferential zones are cut by planes passing through the main axis.

7. The reduction gear according to claim 1, wherein said at least one recess of at least one of the inner and outer segments of each of the spindles comprises an annular groove formed in said segment and extending around the radial axis.

8. The reduction gear of claim 7, wherein the groove is L-shaped.

9. The reduction gear according to claim 7, wherein at least one of the inner and outer segments of each of the spindles comprises two L-shaped grooves arranged symmetrically about a plane perpendicular to the radial axis.

10. The reduction gear according to claim 1, wherein at least one of the inner and outer segments of each of the spindles comprises an inner bore which extends along the entire axial length of that segment.

11. The reduction gear of claim 10, wherein the bore is stepped and comprises several axial portions of different diameters.

12. The reduction gear according to claim 1, wherein said at least one recess of the inner and outer segments of each of the spindles comprise a plurality of recesses which are symmetrically arranged with respect to a plane perpendicular to the radial axis and passing substantially through the middle of the spindle.

13. The reduction gear according to claim 1, wherein said first circumferential zone extends for at least 90° around the radial axis.

14. The reduction gear according to claim 1, wherein said at least one recess of the bridges extends or is distributed over at least 90° around the radial axis.

15. The reduction gear according to claim 1, wherein the inner and outer bridges have the same or similar thicknesses, and each such bridge comprises at least one recess.

16. The reduction gear according to claim 1, wherein the inner and outer bridges have different thicknesses and the one with the greater thickness is the only one comprising at least one recess.

17. A turbomachine comprising the reduction gear according to claim 1.

18. A speed reduction gear for an aircraft turbomachine, this reduction gear having a main axis and comprising:
a planet carrier comprising a cage and a cage carrier,
a sun gear located in the cage and centred on the main axis,
planet gears arranged around the main axis and the sun gear and meshed with the sun gear,
a ring gear arranged around the axis and the cage and meshed with the planet gears,
one element selected from the cage and the cage carrier comprising an annular row of axial fingers disposed about the main axis, and the other of these elements comprising an annular row of axial housings in which the fingers are mounted, each of the housings being delimited by two bridges, respectively radially inner and outer, which comprise radial orifices aligned with a radial orifice of the finger inserted between these bridges, the orifices of the bridges and of the finger being traversed by a spindle oriented along a radial axis, each of the spindles comprising a radially outer segment extending into the orifice of the outer bridge an intermediate segment extending into the orifice of the finger, and a radially inner segment extending into the orifice of the inner bridge wherein:
at least one of the bridges of each of the housings comprises at least one first circumferential zone extending around the radial axis, which comprises at least one recess, and at least one second circumferential zone around the radial axis, which is devoid of recesses, so as to make the at least one of the bridges more flexible, wherein each of the inner and/or outer bridges comprises two first circumferential zones which are diametrically opposed with respect to the radial axis, and two second circumferential zones which are located between the first circumferential zones, and/or at least one of the outer and inner segments of each of the spindles comprises at least one recess which is centred on the radial axis or extends around that radial axis, and the intermediate segment of each of the spindles is free of such a recess, so as to make the spindle more flexible.

19. A speed reduction gear for an aircraft turbomachine, this reduction gear having a main axis and comprising:
a planet carrier comprising a cage and a cage carrier,
a sun gear located in the cage and centred on the main axis,
planet gears arranged around the main axis and the sun gear and meshed with the sun gear,
a ring gear arranged around the axis and the cage and meshed with the planet gears,
one element selected from the cage and the cage carrier comprising an annular row of axial fingers disposed about the main axis, and the other of these elements comprising an annular row of axial housings in which the fingers are mounted, each of the housings being delimited by two bridges, respectively radially inner and outer, which comprise radial orifices aligned with a radial orifice of the finger inserted between these bridges, the orifices of the bridges and of the finger being traversed by a spindle oriented along a radial axis, each of the spindles comprising a radially outer segment extending into the orifice of the outer bridge an intermediate segment extending into the orifice of the finger, and a radially inner segment extending into the orifice of the inner bridge wherein:
at least one of the bridges of each of the housings comprises at least one first circumferential zone extending around the radial axis, which comprises at least one recess, and at least one second circumferential zone around the radial axis, which is devoid of recesses, so as to make the at least one of the bridges more flexible, wherein the inner and outer bridges have the same or similar thicknesses, and each such bridge comprises at least one recess, and/or at least one of the outer and inner segments of each of the spindles comprises at least one recess which is centred on the radial axis or extends around that radial axis, and the intermediate segment of each of the spindles is free of such a recess, so as to make the spindle more flexible.

\* \* \* \* \*